(12) United States Patent
Haggar et al.

(10) Patent No.: US 8,130,647 B2
(45) Date of Patent: *Mar. 6, 2012

(54) METHOD AND APPARATUS FOR MANAGING AGGREGATE BANDWIDTH AT A SERVER

(75) Inventors: Jeffrey Douglas Haggar, Holly Springs, NC (US); Lap Thiet Huynh, Apex, NC (US); Maurice Isrel, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 68 days.

This patent is subject to a terminal disclaimer.

(21) Appl. No.: 12/466,054

(22) Filed: May 14, 2009

(65) Prior Publication Data
US 2009/0225657 A1    Sep. 10, 2009

Related U.S. Application Data

(63) Continuation of application No. 09/824,298, filed on Apr. 2, 2001, now Pat. No. 7,542,419.

(51) Int. Cl.
*H04L 12/26* (2006.01)

(52) U.S. Cl. .......................... 370/232; 370/233; 370/234

(58) Field of Classification Search .................. 370/232, 370/233, 234
See application file for complete search history.

(56) References Cited

U.S. PATENT DOCUMENTS

| | | | |
|---|---|---|---|
| 4,771,391 A | 9/1988 | Blasbalg | |
| 5,491,801 A | 2/1996 | Jain et al. | |
| 5,748,901 A | 5/1998 | Afek et al. | |
| 5,948,069 A | 9/1999 | Kitai et al. | |
| 6,205,120 B1 | 3/2001 | Packer et al. | |
| 6,643,292 B2 | 11/2003 | Chapman et al. | |
| 6,646,987 B1 | 11/2003 | Qaddoura | |
| 6,820,128 B1 | 11/2004 | Firoiu et al. | |
| 7,542,419 B2* | 6/2009 | Haggar et al. | 370/232 |
| 2003/0005144 A1 | 1/2003 | Engel et al. | |
| 2003/0103450 A1 | 6/2003 | Chapman et al. | |

* cited by examiner

*Primary Examiner* — Jason Mattis
(74) *Attorney, Agent, or Firm* — Stevens & Showalter LLP

(57) ABSTRACT

A method, apparatus, and computer implemented instructions for managing traffic in a network data processing system. Traffic for a plurality of network paths is monitored. In response a packet for a particular network path within the plurality of network paths causing traffic for the particular network path to exceed a level of traffic allowed, an amount of available bandwidth is reduced based on a fair share for the particular network path.

7 Claims, 4 Drawing Sheets

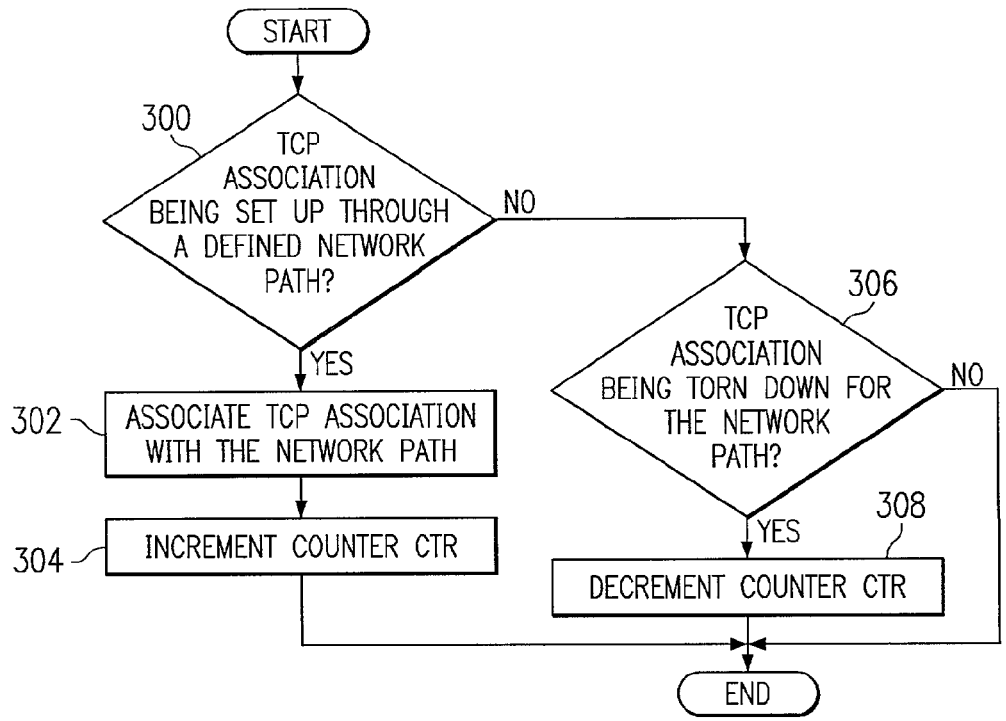
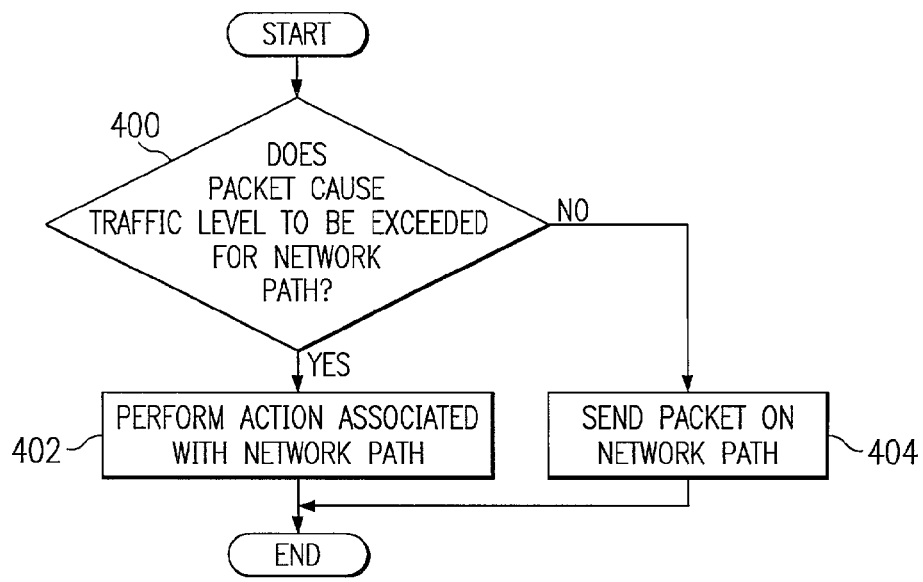

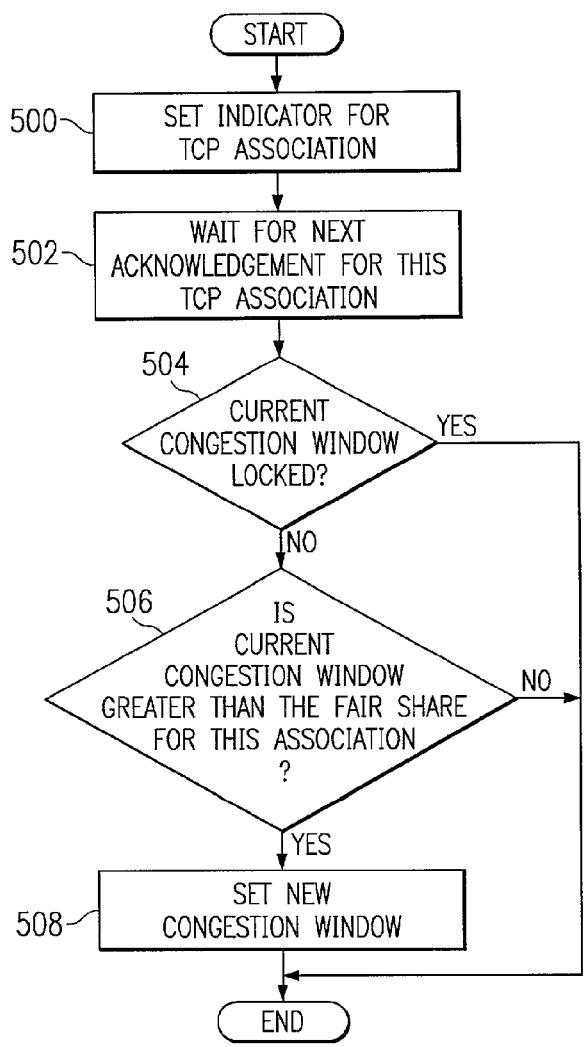

METHOD AND APPARATUS FOR MANAGING AGGREGATE BANDWIDTH AT A SERVER

This application claims the benefit and is a continuation application of application No. U.S. Ser. No. 09/824,298, filed Apr. 2, 2001, and now issued as U.S. Pat. No. 7,542,419, entitled METHOD AND APPARATUS FOR MANAGING AGGREGATE BANDWIDTH AT A SERVER, by Haggar et al., the disclosure of which is incorporated herein by reference.

FIELD OF THE INVENTION

The present invention relates generally to an improved data processing system, and in particular to a method and apparatus for managing the flow of data in a network data processing system. Still more particularly, the present invention provides a method, apparatus, and computer implemented instructions for managing traffic for a set of network connections.

BACKGROUND OF THE INVENTION

The Internet, also referred to as an "internetwork", is a set of computer networks, possibly dissimilar, joined together by means of gateways that handle data transfer and the conversion of messages from protocols of the sending network to the protocols used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies, which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

Transmission Control Protocol/Internet Protocol (TCP/IP) is a communications protocol that this the protocol of the Internet and has become the global standard for communications. TCP provides transport functions, which ensures that the total amount of bytes sent is received correctly at the other end. UDP, which is part of the TCP/IP suite, is an alternate transport that does not guarantee delivery. It is widely used for real time voice and video transmissions where erroneous packets are not retransmitted. TCP/IP is a routable protocol, and the IP part of TCP/IP provides the routing capability. In a routable protocol, all messages contain not only the address of the destination station, but the address of a destination network. This address allows TCP/IP messages to be sent to multiple networks within an organization or around the world. User datagram protocol (UDP) is a protocol within the TCP/IP protocol suite used in place of TCP when a reliable delivery is not required.

TCP or UDP traffic is generally policed at a server based on factors such as round trip time of data or packet loss. As a given network path becomes congested, the round trip time of the data goes up or packets are dropped by intermediate devices on that network path. In these cases, when the server detects this congestion, it will invoke some form of congestion control, limiting how much traffic is allowed across a given TCP or UDP association. A TCP or UDP association is all traffic between one unique source and destination IP and port address pair. For example, IP1 port 1 to IP2 port 1 is one association. IP1 port 1 to IP3 port 1 would be another association. When this association is only for TCP traffic, this association is referred to as a TCP connection. When this association is only for UDP traffic, it is referred to as a UDP association. This congestion control uses limits such as congestion windows, which are windows that allow a certain amount of data to be sent before receiving an acknowledgment from the client. By lowering these limits, such as a TCP congestion window, less data is sent for that given TCP or UDP association. As each TCP or UDP association sends less data, round trip time should go down, less packets should be dropped by previously overloaded devices, and maximum throughput should be achieved for a given network path.

The problem is that this congestion may not be detected until congestion reaches a state such that round trip time delay is detected or packets are already being dropped. By the time the server detects this, the network congestion may be such that only significant reductions in sending of data may relieve the congestion, and the traffic is thus subject to burstiness. If packets are being dropped by intermediate devices, then not only must the sending of data be reduced, but previously transmitted packets must be retransmitted, adding more traffic to send at a slower rate, and thus reducing true throughput even more. Furthermore, reductions in congestion are generally on a per TCP or per UDP association. Thus, though only one or two of the associations may be causing the congestion, the round trip time delays and dropped packets will likely be detected for all associations. This situation causes congestion control to be invoked for associations that are sending far less data than those who may be truly congesting the network.

Therefore, it would be advantageous to have an improved method and apparatus for managing bandwidth use or traffic at a server for a set of network connections.

SUMMARY OF THE INVENTION

The present invention provides a method, apparatus, and computer implemented instructions for managing traffic in a network data processing system. Traffic for a plurality of network paths is monitored. In response a packet for a particular network path within the plurality of network paths causing traffic for the particular network path to exceed a level of traffic allowed, an amount of available bandwidth is reduced based on a fair share for the particular network path.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a flowchart of a process used for tracking TCP connections in a network path in accordance with a preferred embodiment of the present invention;

FIG. 4 is a flowchart of a process used for managing bandwidth for a network path in accordance with a preferred embodiment of the present invention;

FIG. 5 is a flowchart of a process used for changing a congestion window size in accordance with a preferred embodiment of the present invention;

FIG. 6 is a flowchart of a process used for setting a type of service in accordance with a preferred embodiment of the present invention;

FIG. 7 is a flowchart of a process used for indicating that UDP traffic for a network connection has been exceeded in accordance with a preferred embodiment of the present invention.

DETAILED DESCRIPTION OF THE PREFERRED EMBODIMENT

Figure 1:
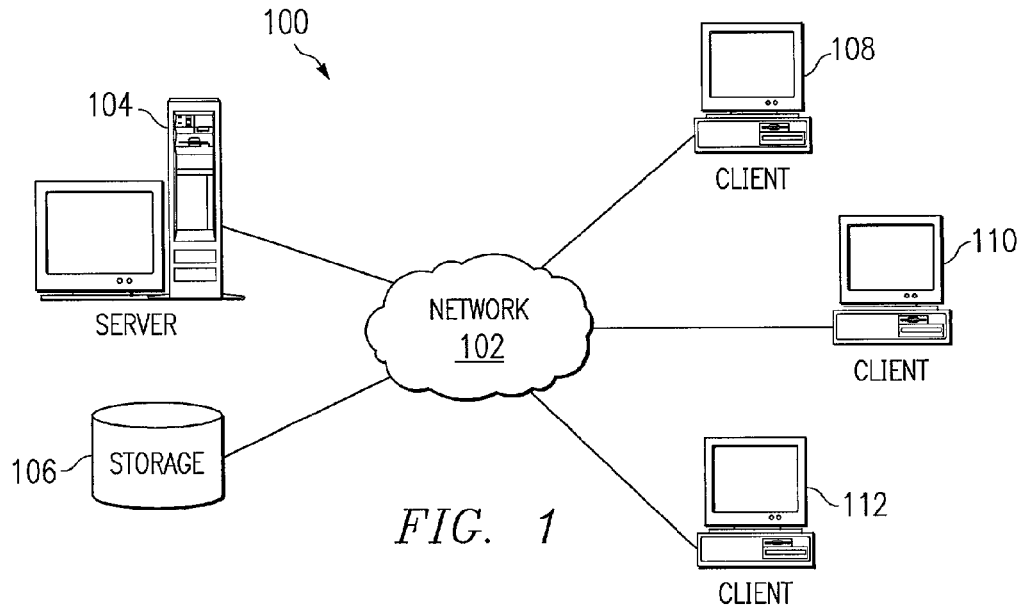
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
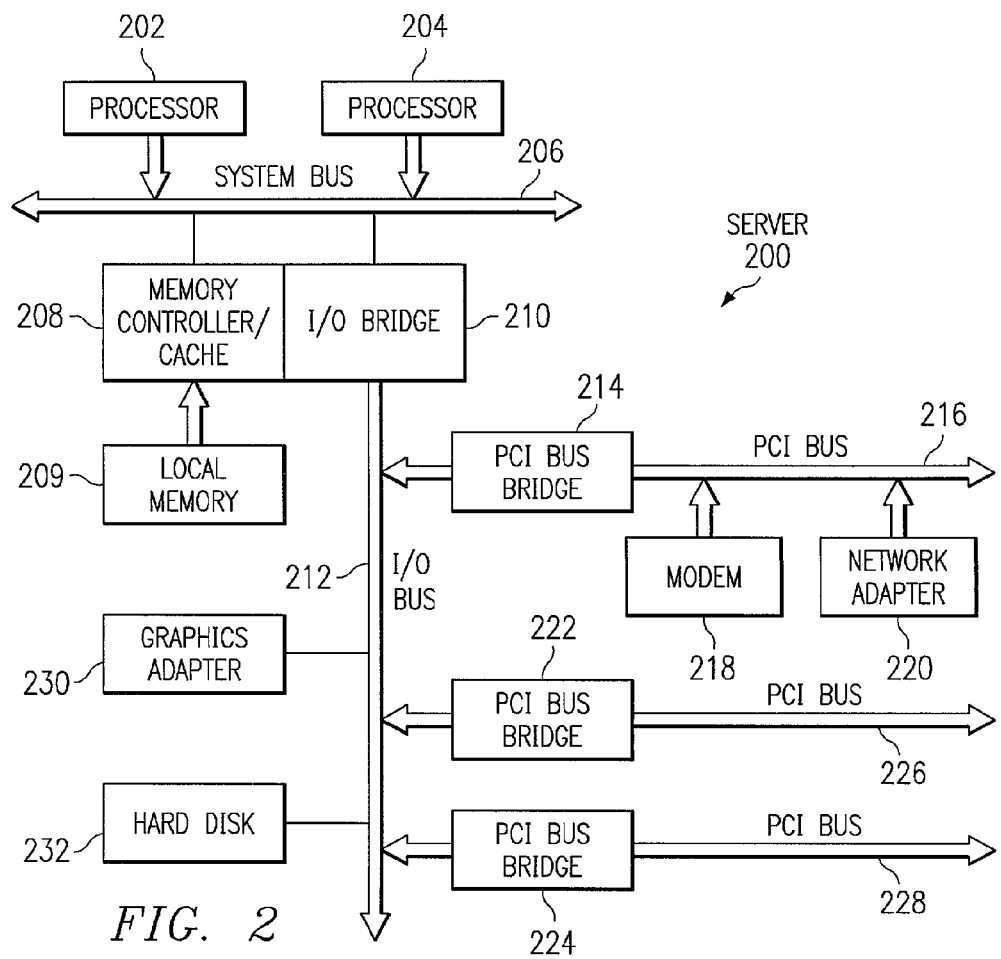
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

The present invention provides an improved method, apparatus, and computer implemented instructions for managing traffic or bandwidth at a server. This mechanism monitors bandwidth use for a group of connections through a network path within a network data processing system. In these examples, a network path is defined by parameters such as source and destination IP addresses, ports, interfaces used, protocol, sending application, and time of day. Of course, other parameters associated with a network path may be used.

The mechanism of the present invention monitors a level of allowed or maximum sustainable traffic. A level of allowed or maximum sustainable traffic is monitored at the server for a given network path. Then, the server monitors all traffic passing through the network path against the allowed levels for that network path. If those levels are exceeded, the server may invoke congestion control immediately, rather than waiting to detect slower round trip times or detecting lost packets.

In particular, the server monitors aggregate bandwidth or traffic for a set of TCP connections or UDP associations through a network path. If a packet sent on one TCP connection causes the amount of traffic to exceed some level of traffic allowed for that network path, the amount of bandwidth for the TCP connection can be reduced if the traffic on that particular connection exceeds its fair share of the bandwidth, or the packet can be sent with a changed type of service (TOS) byte. If a packet sent for one UDP association causes the amount of traffic to exceed some level of traffic allowed for that network path, the UDP packet can be dropped, the packet can be sent with a changed TOS byte, or the sending application can be notified of the exceeding bandwidth.

For example, if ten active TCP connections are present and a packet on a selected network path exceeds bandwidth set or allocated for the network path, a determination is made as to whether the traffic on the selected TCP connection exceeds the fair share of traffic for the selected network path. In this example, the fair share may be one-tenth of the traffic. If the packet sent on the TCP connection causes the traffic to be greater than one-tenth of the traffic allowed for the network path, then the traffic on the selected TCP connection is reduced. Otherwise, if the fair share has not been exceeded, the traffic may be reduced for other TCP connections other than the selected connection.

In this manner, the mechanism of the present invention invokes congestion control before the network becomes congested and before packets are dropped. Thus, maximum throughput is achieved without dropped packets and with less variability, such as less burstiness. In these examples, for TCP the congestion control is only invoked for any connection exceeding its fair share of the desired traffic level. For UDP, either packets exceeding the defined level would be dropped, the sending application could be notified to invoke its own congestion control, or the type of service (TOS) byte in the IP header could be changed. This byte is a field in an IP packet (IP datagram) that is used for quality of service (QoS). QoS is the ability to define a level of performance in a data communications system. For example, ATM networks specify modes of service that ensure optimum performance for traffic such as real time voice and video. In response to receiving the indication, the application may invoke Adaptive Rate Based Pacing slowdown immediately.

In the depicted examples, the following are parameters defined at the server: N, L, A, T, F, MinW, and MaxW. N represents a logical networking path. N may be defined by parameters known by the server. These parameters also are ones that will not change dynamically without server knowledge. Examples of these parameters used to define a logical networking path are as follows:
(1) IP address (any traffic going to or from a given IP address or address range); (2) IP port (any traffic going to or from a given IP port or port range; (3) protocol (such as, but not limited to, TCP, UDP, RAW); (4) interface (any outbound traffic going through this server attached device); (5) application (any traffic coming from this particular application), which may be defined as the job name of the application and URL; (6) application data (e.g., type of traffic, interactive, and video streaming); and (7) time (any traffic sent during a particular time frame with a granularity which may vary, such as from a second to a year).

Multiple network paths may be defined to the server. For each network path, the following parameters are defined on the server. L is a definition of the level of traffic allowed for a network path. L should be some level that allows the measuring of aggregate traffic through the networking path. An example would be the parameters of a leaky bucket algorithm, such as mean rate, peak rate, burst size, and maximum packet size.

The action required is represented as A. This action is the action required if the traffic through the network path exceeds L. The action may vary for different protocols. For example, if the protocol is TCP, the congestion window size may be dropped or reduced, or the TOS may be changed. For other protocols, the action may include, informing the sending application to decrease its sending size, dropping the packet, or changing the TOS.

T represents the desired value of the outgoing TOS byte in the IP packet if traffic exceeds level L. F is the fraction to cut the congestion window size for each TCP connection that must have its traffic rate reduced if traffic exceeds level L, and could be a number between 0 and 1. As an example, F might first be defined as ½, allowing the TCP connections needing rate reductions to only send ½ as much data as their previous congestion window allowed. F can be varied depending on the network path. If ½ caused too much reduction and the full bandwidth of the network path was therefore not being utilized, this number could be raised (¾, etc.). If ½ did not slow down traffic sufficiently on that network path, and packets were still being dropped, this number could be reduced (¼, etc.). MinW is the minimum congestion window size for each TCP connection, while MaxW is the maximum congestion window size for each TCP connection.

The flowcharts in FIGS. 3-8 illustrate different functions performed in monitoring bandwidth at a server. With reference now to FIG. 3, a flowchart of a process used for tracking TCP connections in a network path is depicted in accordance with a preferred embodiment of the present invention. This process is used to track TCP connections for each network path.

The process begins with a determination as to whether a TCP connection is being setup through a defined network path (step 300). Step 300 is done by determining if the path between the source and destination IP addresses of the TCP connection matches one of the defined network paths. For example, if the defined network path was all data flowing through network adapter x, and a TCP connection was established whose path flowed through network adapter x, then this connection would be considered through the defined network path. If the TCP connection is setup through the defined network path, the network path is associated with the TCP connection (step 302). This is hereafter called an associated network path. Next, a counter CTR is incremented (step 304) with the process terminating thereafter. This counter represents the number of TCP connections currently using the network path.

With reference again to step 300, if a TCP connection is not being setup through a network path, a determination is made as to whether a TCP connection is being torn down for the network path (step 306). If a TCP connection is being torn down, the counter CTR decrements (step 308) with the process terminating thereafter. Turning back to step 306, if a TCP connection is not being torn down, the process terminates.

Turning now to FIG. 4, a flowchart of a process used for managing bandwidth for a network path is depicted in accordance with a preferred embodiment of the present invention. This process is initiated each time a TCP packet is to be sent onto one of the network paths.

The process begins with a determination as to whether a TCP packet causes traffic level to be exceeded for a network path (step 400). In this example, the traffic level is represented by the parameter L as described above. If the packet does cause the traffic level to be exceeded for the network path, then an action is performed with the associated network path (step 402) with the process terminating thereafter. Examples of different actions are illustrated in FIGS. 5-6 below. Otherwise, the packet is sent on the network path (step 404) and the process terminates.

Turning next to FIG. 5, a flowchart of a process used for changing a congestion window size is depicted in accordance with a preferred embodiment of the present invention. The process illustrated in FIG. 5 is an example of an action taken in step 402 in FIG. 4.

The process begins by setting an indicator for TCP connection (step 500). Thereafter, the process waits for the next acknowledgment for the TCP connection (step 502). A determination is then made as to whether the current congestion window is locked (step 504).

If the current congestion window is not locked, a determination is made as to whether the current congestion window is greater than the fair share for this connection (step 506). The determination in step 506 may be made by determining whether the congestion window size, CW, is greater than L/CTR. If so, then a new congestion window is set (step 508) with the process terminating thereafter. In this example, the new congestion window may be set as follows: CW=max (MinW, min (CW*F,MaxW)). Otherwise, the process terminates. Turning back to step 504, if the current congestion window is locked, the process terminates.

With reference now to FIG. 6, a flowchart of a process used for setting a type of service is depicted in accordance with a preferred embodiment of the present invention. The process illustrated in FIG. 6 is an example of an action that may be taken in step 402 in FIG. 4 and step 810 in FIG. 8.

The process begins by setting a type of service for a packet (step 600). Next, the packet is sent to the destination on the network path (step 602) with the processing terminating thereafter.

Turning next to FIG. 7, a flowchart of a process used for indicating that traffic for a UDP association has been exceeded is depicted in accordance with a preferred embodiment of the present invention. The process illustrated in FIG. 7 is an example of an action that may be taken in step 810 in FIG. 8.

The process begins by setting an indicator for sending an application on the server an indication that the traffic level allowed for an associated network path has been exceeded (step 700). Next, the packet is sent to the destination on the network (step 702) with the process terminating thereafter.

Figure 8:
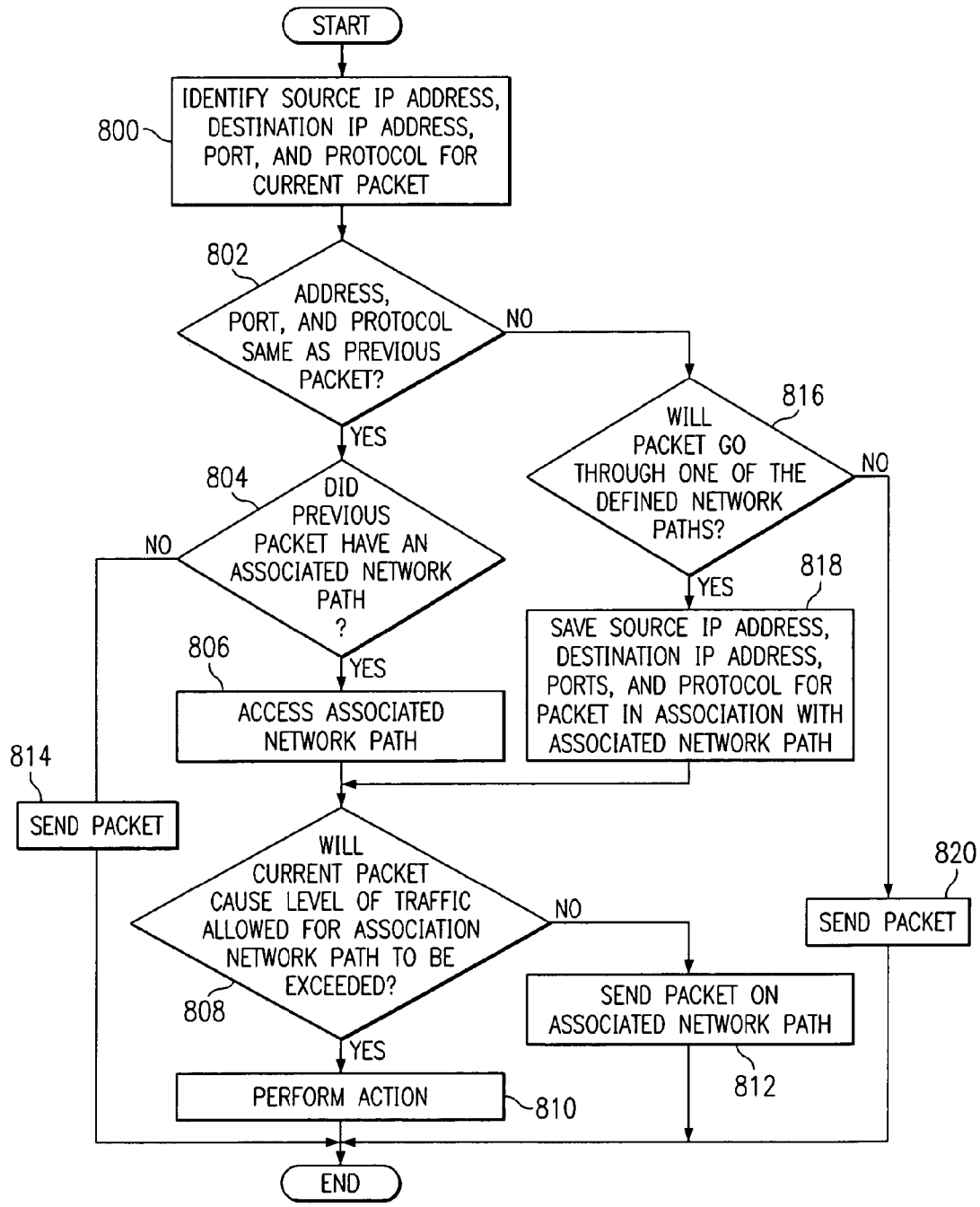
FIG. 8 is a flowchart of a process used for handling UDP data packets sent on network connections in accordance with a preferred embodiment of the present invention.

Turning now to FIG. 8, a flowchart of a process used for handling UDP data packets sent over network paths are depicted in accordance with a preferred embodiment of the present invention.

The process begins by identifying a source IP address, destination IP address, port, and protocol for a current packet (step 800). Next, a determination is made as to whether the address, port, and protocol are the same as the previous packet (step 802). If the address, port, and protocol are the same as the previous packet, a determination is then made as to whether the previous packet had an associated network path (step 804). If the previous packet had an associated network path, that associated network path's allowed level of traffic is used to determine what action is required for this packet (step 806).

A determination is then made as to whether the current packet will cause the level of traffic allowed for the associated network path to be exceeded (step 808). If so, the action is performed (step 810) with the process terminating thereafter. Examples of different actions are illustrated in FIGS. 6 and 7 above. Of course, other actions may be taken. For example, the packet may be dropped in step 810 in FIG. 8.

Turning back to step 808, if the current packet does not cause the level of traffic allowed for the associated network path to be exceeded, the packet is then sent on the associated network path (step 812) and the process terminates.

Turning back to step 804, if the previous packet had the same address, port, and protocol as this packet, but there was not an associated network path, this packet is sent without checking for any level of traffic being exceeded. This type of sending occurs because this packet is being sent on another network path that was not defined for policing and hence is not to be policed. Consequently, no association is made between the current packet and a network path (step 814), and the process terminates. With reference again to step 802, if the address, port, and protocol are not the same as the previous packet, a determination is then made as to whether this packet will go through one of the defined network paths (step 816). If the packet is to go through one of the defined network paths, the source IP address, destination IP address, ports and protocol for the packet in association with the associated network path is saved (step 818). The packet is then sent to step 808 as described above. Turning back to step 816, if the packet does not go through one of the defined network paths, the packet is sent without checking for any level of traffic being exceeded. This type of sending occurs because this packet is being sent on another network path that was not defined for policing and hence is not to be policed. As a result, no association is made between the current packet and a network path, (step 820) and the process terminates.

Thus, the present invention provides an improved method, apparatus, and computer implemented instructions for managing bandwidth as a server. In particular, the server is used to monitor aggregate bandwidth or traffic for a set of network paths. If a packet sent on one of these network paths causes the amount of traffic to exceed some level of traffic allowed for this set of network paths, the amount of bandwidth for the network path is reduced if the traffic on that particular network path exceeds its fair share of the bandwidth.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing traffic in a network data processing system, the method comprising:
    monitoring at a server an aggregate traffic amount for a plurality of TCP connections or UDP associations through a given network path;
    prior to sending a packet on a particular TCP connection or UDP association within the plurality of TCP connections or UDP associations, determining if the packet will cause the aggregate traffic amount for the network path to exceed a level of aggregate traffic allowed and, if the packet will cause the aggregate traffic amount for the network path to exceed the level of aggregate traffic allowed, reducing the traffic for one of the particular TCP connection or UDP association and another TCP connection or UDP association using an action based on a transmission protocol corresponding to the one TCP connection or UDP association, and
    wherein when the one TCP connection or UDP association comprises a TCP connection, the action comprises reducing a congestion window size by multiplying an amount of bandwidth available by a dynamic variable that is adjusted using changing requirements of the network path to reduce the amount of bandwidth available based on a fair share for the one TCP connection.

2. The method of claim 1, wherein the aggregate traffic amount is monitored using at least one of a data transfer rate, peak data transfer rate, burst size, and maximum packet size.

3. The method of claim 1, wherein the congestion window size is reduced as follows:

$$CW = \max(MinW, \min(CW*F, MaxW))$$

wherein CW is the congestion window size, MinW is a minimum congestion window size for the one TCP connection, MaxW is a maximum congestion window size for the one TCP connection, and F is the dynamic variable.

4. The method of claim 1, wherein the action comprises: setting a quality of service for packets.

5. The method of claim 1, wherein the action comprises: dropping the packet.

6. The method of claim 1, wherein if the packet will cause the aggregate traffic amount for the network path to exceed the level of aggregate traffic allowed for the network path, further determining if the packet will cause the traffic for the particular TCP connection or UDP association to exceed its fair share amount of the network path and if so reducing the traffic for the particular TCP connection or UDP association.

7. The method of claim 1, wherein said monitoring at a server comprises monitoring at a source the traffic for the plurality of TCP connections or UDP associations through a given network.

* * * * *